United States Patent [19]
Koma

[11] Patent Number: 5,413,379
[45] Date of Patent: May 9, 1995

[54] KNEE BOLSTER STRUCTURE

[75] Inventor: Yasuyuki Koma, Columbus, Ohio

[73] Assignee: Honda Giken Kogyo Kabushiki Kaisha, Tokyo, Japan

[21] Appl. No.: 121,526

[22] Filed: Sep. 16, 1993

[51] Int. Cl.⁶ .......................................... B60R 21/045
[52] U.S. Cl. .................................... 280/752; 280/751
[58] Field of Search ...................... 280/751, 752, 748; 297/216, 426

[56] References Cited

U.S. PATENT DOCUMENTS

| | | |
|---|---|---|
| 4,709,943 | 12/1987 | Yoshimura et al. ............... 280/751 |
| 4,893,834 | 1/1990 | Honda et al. ..................... 280/751 |
| 4,979,136 | 12/1990 | Tomita et al. .................... 280/751 |
| 5,071,162 | 12/1991 | Takagawa ......................... 280/752 |
| 5,096,223 | 3/1992 | Tekelly et al. ................ 280/751 X |
| 5,190,314 | 3/1993 | Takasugi .......................... 280/752 |

FOREIGN PATENT DOCUMENTS

| | | | |
|---|---|---|---|
| 0082852 | 4/1988 | Japan | .................................... 280/752 |
| 3109417 | 5/1991 | Japan | .................................... 280/751 |

Primary Examiner—Margaret A. Focarino
Assistant Examiner—Christopher P. Ellis

[57] ABSTRACT

A knee bolster for a vehicle for supporting a knee of a vehicle occupant in case of a vehicle crash includes a deformable energy absorbing member positioned opposite to the knee of the vehicle occupant. The deformable energy absorbing member has a first end and a second end defining a predetermined length. A support member is operatively connected to at least one of the first end and the second end of the deformable energy absorbing member. The support member is a deformable energy absorbing member extending at a predetermined angle relative to the deformable energy absorbing member to a distal end thereof. A guide member is operatively positioned to engage the distal end of the support member, the guide member includes a guide portion received within and overlap the distal end. A support beam is deformable for absorbing energy from the deformable energy absorbing member through the support member, the support beam includes a first end and a second end. The guide member is secured to the support beam and at least one end of the support beam is secured to a frame member of a vehicle.

7 Claims, 4 Drawing Sheets

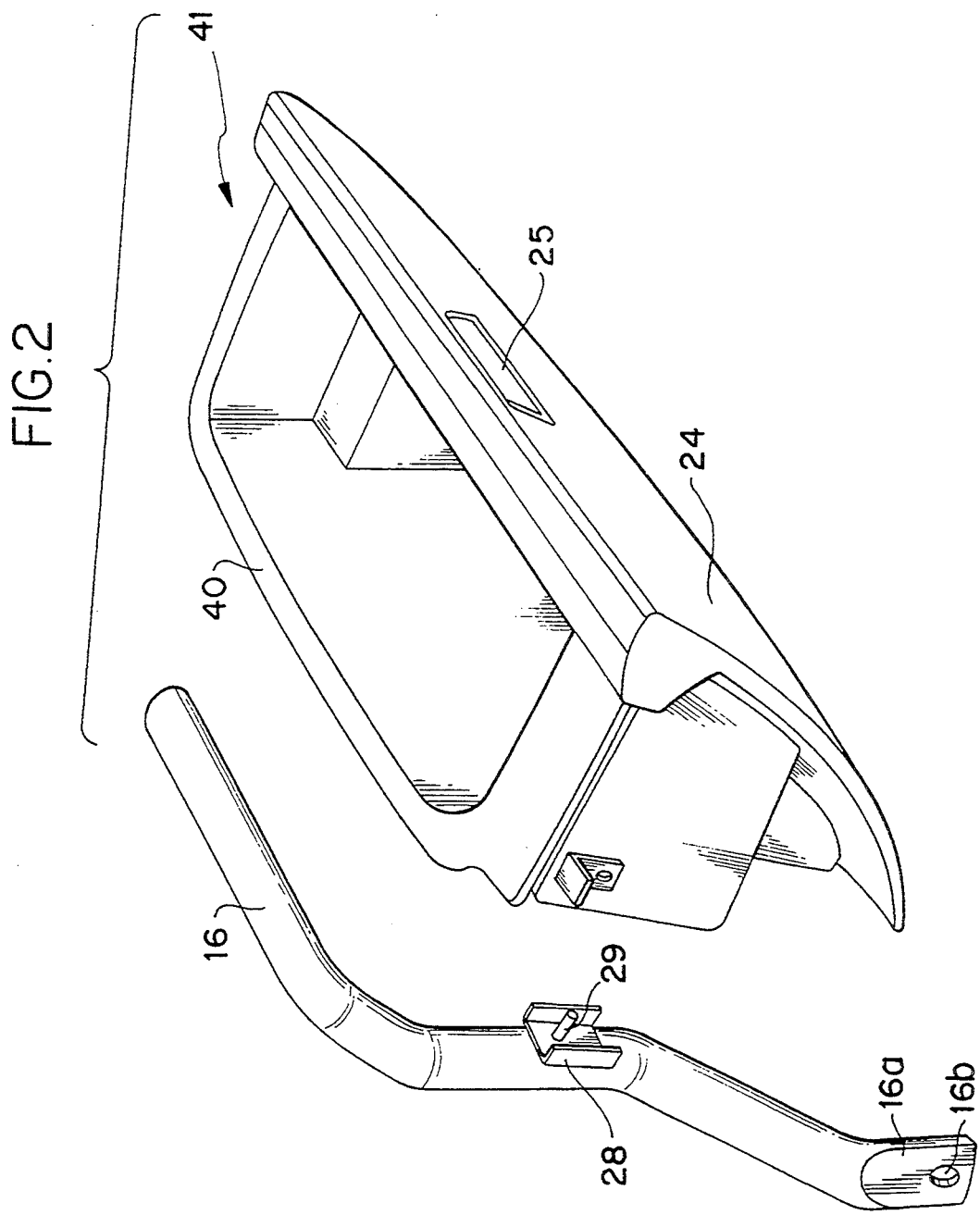

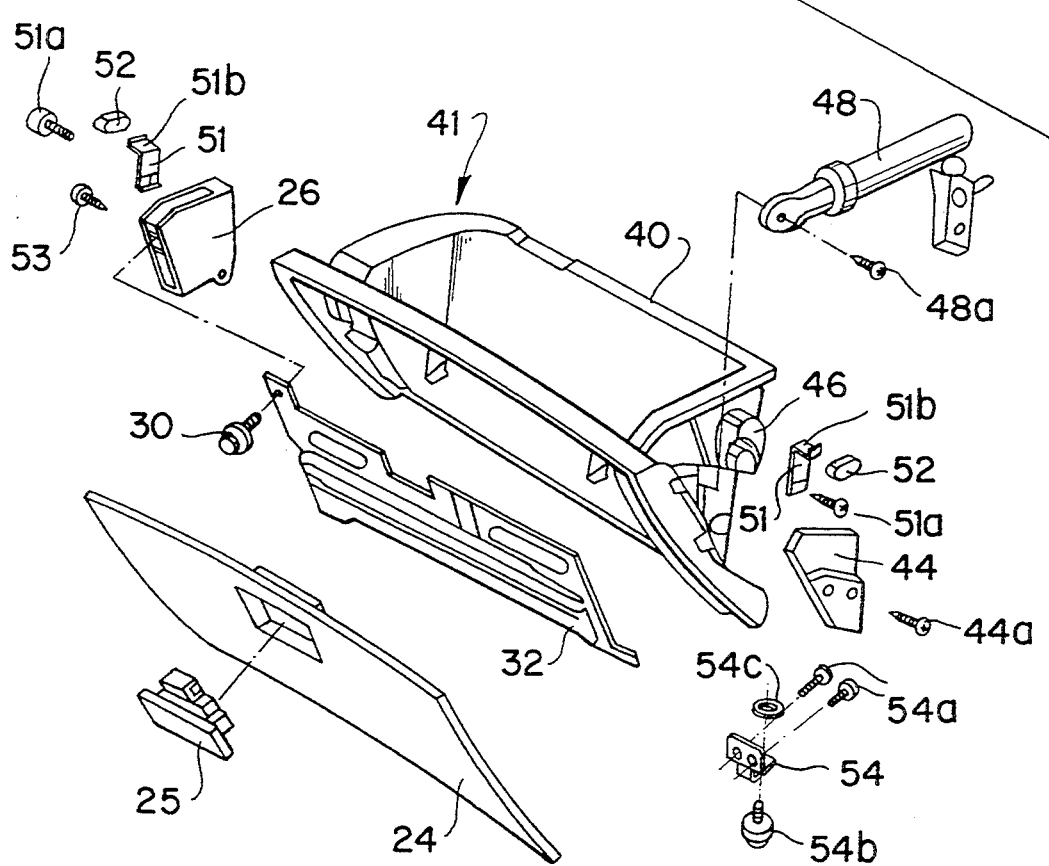

KNEE BOLSTER STRUCTURE

BACKGROUND OF THE INVENTION

1. Field of the Invention

A knee bolster structure is disclosed for supporting a knee of a vehicle occupant in a situation wherein the vehicle is involved in a crash. The knee bolster absorbs a maximum amount of energy from an impact of an occupant's knee at a controlled rate.

2. Description of Background Art

Hithertofore, knee bolster structures have been provided for supporting the knees of a vehicle occupant during a vehicle crash. A knee bolster is effective during a crash due to the fact that an occupant is thrown forward and the lower part of his/her body tends to be thrown with his/her knees first and the upper part of the body pulled downwardly. In view of the fact that safety belts and air bag restraining devices are utilized to protect the upper portion of an occupant's body, it is necessary to provide a structure to assist in the protection of an occupant's knees.

Conventional knee bolsters are not sufficiently effective. For example, a simple knee bolster consisting of a steel plate press-formed into a box shape tends to deform very easily during the initial contact with an occupant's knees. Thereafter, the resistance of the knee bolster to the occupant's knees tends to increase sharply as deformation progresses. When a semi-cylindrical knee bolster is used, with its cylindrical surface opposing a knee of a vehicle occupant, an impact from the knee causes a central portion of the knee bolster to depress further than the parts located on either lateral side thereof. In this situation, a sharp increase in the impact force applied to the knee occurs because further deformation of the knee bolster requires a larger amount of buckling deformation. The deformation of the knee bolster is not necessarily stable. Therefore, resistance which occurs when the knee engages the knee bolster may vary depending on various conditions regarding the way in which the knee hits the knee bolster.

A knee bolster has been proposed wherein an energy absorbing member is placed opposite to a knee of an occupant of a vehicle. The energy absorbing member is disposed on a substantially rigid load supporting member. This disclosure is designed to absorb energy in a maximum amount at a controlled rate without excessive resistance to the knee.

A problem exists with regard to conventional knee bolsters used on the passenger side of a vehicle. The conventional knee bolsters are too large and thus take up too much space from the interior of a glove box which is disposed on the passenger side. In addition, the box shape of a conventional glove box tends to deform obliquely and the resistance of the glove box to the knees tends to decrease sharply as the oblique deformation progresses.

SUMMARY AND OBJECTS OF THE INVENTION

An object of the present invention is to provide a knee bolster which is supported adjacent to the knees of an occupant of a vehicle for absorbing shock from the knees during a vehicle crash.

Another object of the present invention is to provide a support member operatively connected to at least one end of a deformable energy absorbing member. The support member is a deformable energy absorbing connector disposed at a predetermined angle relative to the deformable energy absorbing member and extending to a distal end.

Another object of the present invention is to provide a guide member operatively positioned to engage the distal end of the support member. The guide member includes a guide portion adapted to be received within and overlap the distal end.

A further object of the present invention is to provide a support beam deformable for absorbing energy from the deformable energy absorbing member through the support member.

A still further object of the present invention is to provide a guide member which is secured to the support beam and at least one end of the support beam is secured to a frame member of a vehicle.

A further object of the present invention is to overcome deficiencies with regard to conventional knee bolsters positioned adjacent to a glove box.

These and other objects of the present invention are achieved by providing a knee bolster for a vehicle for supporting a knee of an occupant of the vehicle in the case of a vehicle crash. A deformable energy absorbing member is adapted to be placed opposite to the knee of the vehicle occupant. The deformable energy absorbing member includes a first end and a second end having a predetermined length. The support member is operatively connected to at least one of the first end and the second end of said deformable energy absorbing member. The support member is a deformable energy absorbing connector extending at a predetermined angle relative to the deformable energy absorbing member to a distal end. A guide member is operatively positioned to engage the distal end of the support member. The guide member includes a guide portion adapted to be received within and overlap the distal end. A support beam is deformable for absorbing energy from the deformable energy absorbing member. The guide member is secured to the support beam and at least one end of the support beam is secured to a frame member of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an exploded view illustrating the relationship of a glove box to a support rod;

FIG. 3 is an exploded view illustrating the relationship of the deformable energy absorbing member, the support member, and other features of the glove box;

DETAILED DESCRIPTION OF THE PREFERRED EMBODIMENTS

Figure 1:
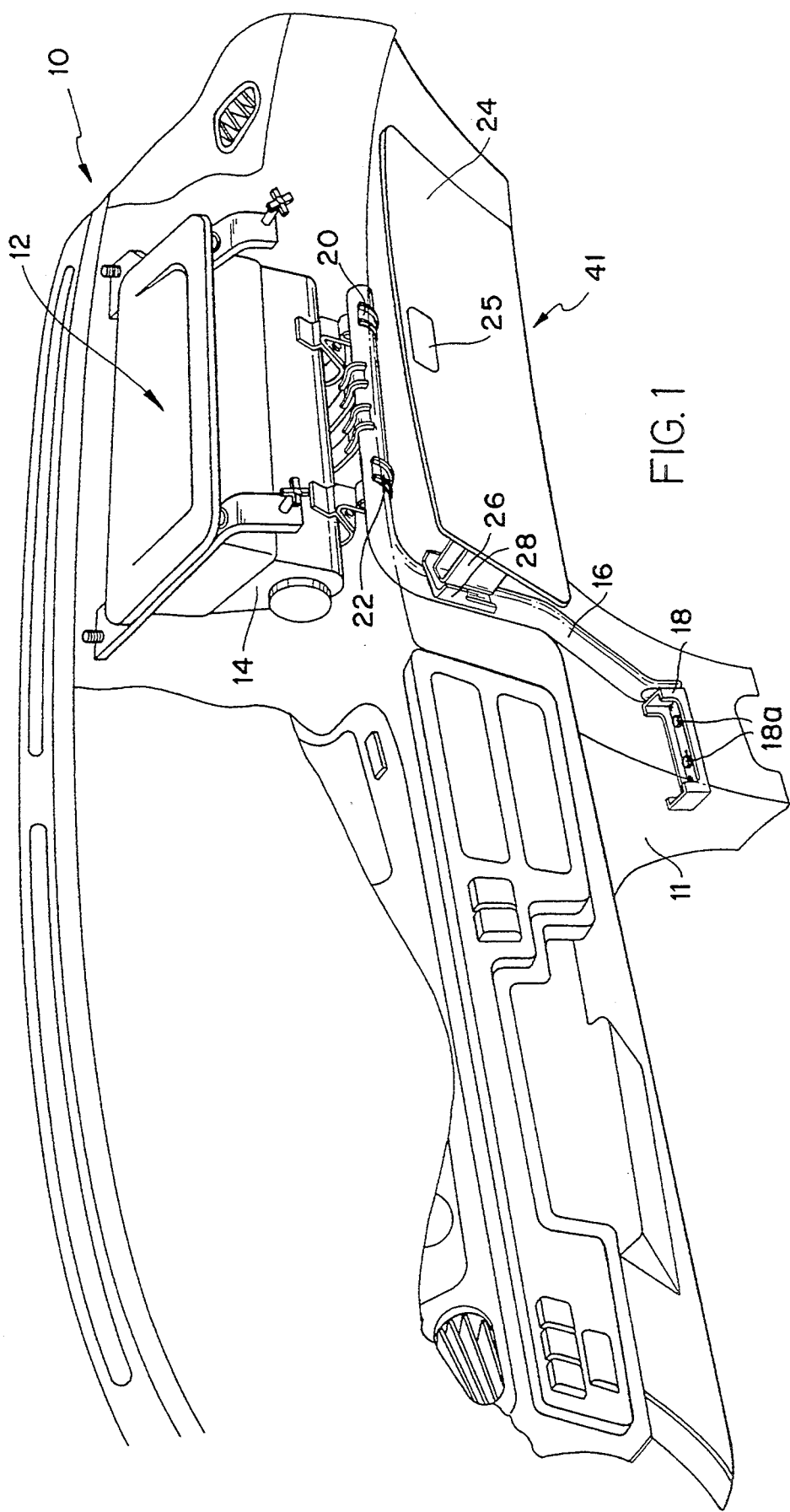
FIG. 1 is a partial cutaway view illustrating the knee bolster according to the present invention positioned adjacent to a vehicle dashboard.

As illustrated in FIG. 1, a vehicle dashboard 10 is provided which includes an air bag lid 12 operatively disposed adjacent to an occupant's seat in the vehicle. The air bag lid 12 is disposed adjacent to an air bag detonating mechanism 14 which is disposed within the vehicle dashboard 10. Bolts and other fastening mechanisms are provided for securing the air bag detonating mechanism 14 relative to the vehicle body.

A support bracket 16 is operatively secured to a vehicle frame 11 by means of a bracket 18. The bracket 18 is secured by means of screws 18a into the vehicle frame 11. Brackets 20, 22 are provided beneath the vehicle dashboard 10 for securing a second end of the support bracket 16 relative to the vehicle body. A bracket 28 is provided which is secured to the support bracket 16 for mounting a guide member. A support member 26 is operatively affixed to a glove box closure member 24 of a glove box 41. An opening mechanism 25 for the glove box 41 is provided to permit an occupant to gain access to the interior of the glove box 41.

FIG. 1 is a partial cutaway view illustrating a number of elements which are disposed beneath the vehicle dashboard 10. The closure member 24 for the glove box 41 forms a continuous front surface disposed adjacent to the vehicle dashboard 10 when the closure member 24 is in the closed position. FIG. 1 merely illustrates the various components which are disposed behind the glove box 41 for purpose of illustration only.

FIGS. 2 and 3 are exploded views illustrating a housing 40 for the glove box 41 which includes the lid 24 disposed on the outer surface thereof. A lock mechanism 25 is provided for the glove box 41 to secure the box relative to the vehicle body. An occupant may open the glove box 41 by actuating the lock mechanism 25. The support bracket 16 includes a first end 16a having an aperture 16b disposed therein. The aperture 16b is designed to receive a bolt for securing the support bracket 16 relative to the bracket 18.

A bracket 28 is provided which is secured to the support bracket 16. A guide member 29 projects from the bracket 28 to extend within a support member which will be described later.

As illustrated in FIG. 3, a support member 26 is designed to be secured to at least one end of the glove box 41. The other end of the glove box 41 includes a plate member 46 and a second plate 44 affixed to the glove box 41. A damper assembly 48 is affixed to the glove box 41 by means of a screw 48a for permitting the glove box 41 to slowly open. A deformable energy absorbing member 32 is affixed to the glove box 41 by means of a bolt 30 which secures the deformable energy absorbing member 32 to the support member 26.

A stopper 51 is positioned on each side of the glove box 41 by means of a screw 51a. A rubber stopper 52 is disposed on an outwardly projecting portion 51b of the stopper 51. When the glove box 41 is closed, the rubber stopper 52 positioned on the outwardly projecting portion 51b of the stopper 51 engages a stop positioned with the vehicle dashboard. A screw 53 together with the bolt 30 may be utilized for securing the support member 26 relative to the glove box 41. A hinge 54 is provided for attachment to the glove box 41 by means of screws 54a. A screw 54b and washer 54c may be utilized for securing the hinge 54 relative to a frame member of the vehicle.

Figure 5:
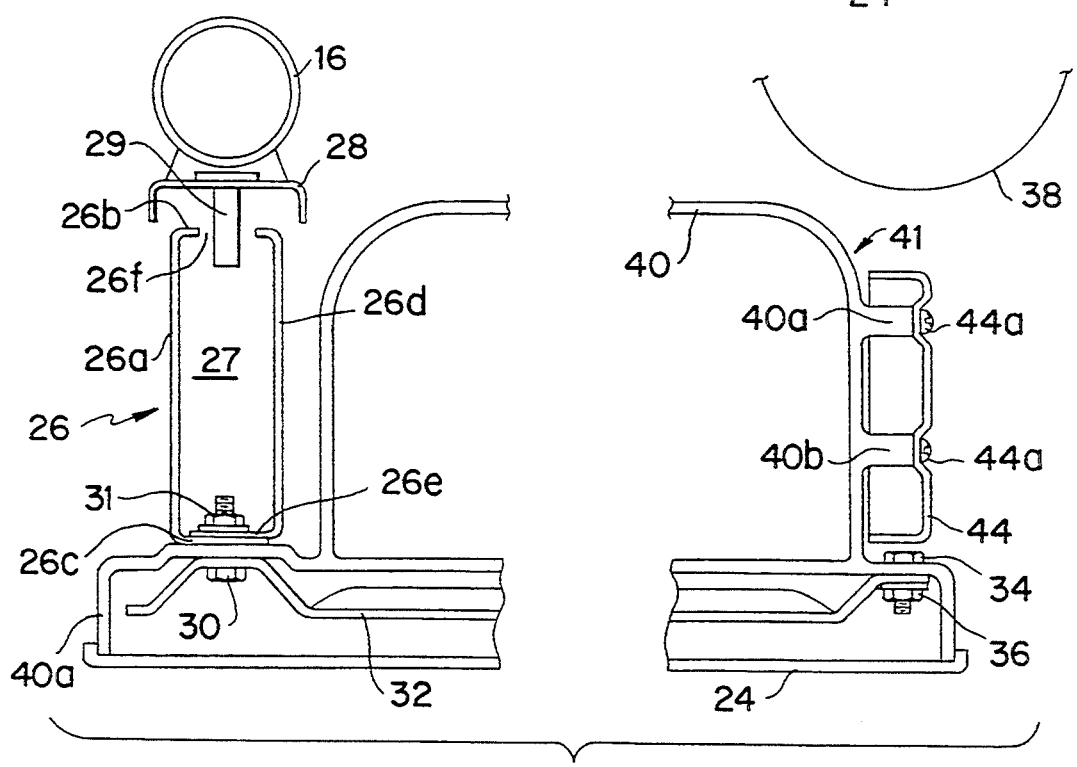
FIG. 5 is a partial cross-sectional view illustrating the relationship of the deformable energy absorbing member, the support member, and other features of the present invention.

FIG. 5 is a partial cross-sectional view illustrating the support bracket 16 disposed to the rear of the glove box 41. The bracket 28 is secured to the support bracket 16 for positioning the guide member 29 to project therefrom.

The support member 26 includes a first wall member 26a with an end portion 26b disposed at one end and a flange 26c disposed at a second end. Similarly, a second wall 26d is connected to the end portion 26b and includes a flange 26e disposed at one end. An open space 27 is provided between the wall members 26a, 26d. An enlarged aperture 26f is provided in the end portion 26b for accommodation the guide member 29 which projects into the open space 27. The bolt 30 works in conjunction with a nut 31 for securing the flanges 26c, 26e relative to a front wall 40a of the glove box 41. The deformable energy absorbing member 32 is also secured to the wall 40a and the support member 26 by means of the bolt 30 and nut 31. The lid 24 for the glove box 41 is positioned to enclose the deformable energy absorbing member 32 and the plate member 40a.

As illustrated in FIG. 5, the right side of the glove box 41 includes projections 40a, 40b which extend therefrom. The plate 44 is secured to the projections 40a, 40b by means of screws 44a. A bolt 34 works together with a nut 36 for securing the deformable energy absorbing member 32 relative to the glove box 41.

Figure 4A:
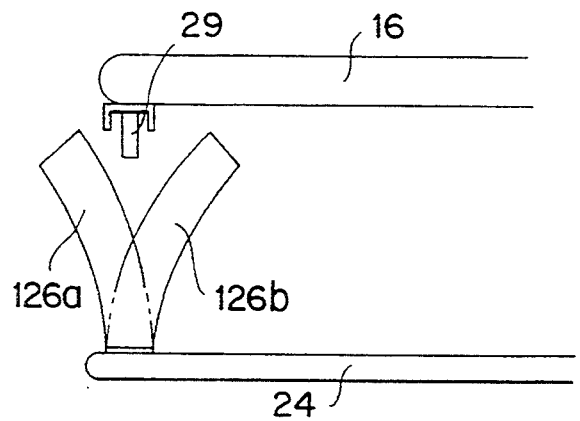
FIG. 4a is an enlarged view of a support member which is not constructed according to the present invention and illustrating the non-preferred deformation of the support member.

As illustrated in FIG. 4a, if an impact occurs and an occupant's knees engage the closure member 24, a deformable energy absorbing member disposed within the closure member 24 will be driven rearwardly to engage the wall members 126a, 126d with the bracket 28. If the wall members 126a, 126d are not secured together, the force applied thereto will spread the wall members 126a, 126d apart and will not provide a controlled absorption of the force applied to the deformable energy absorbing member.

Figure 4B:
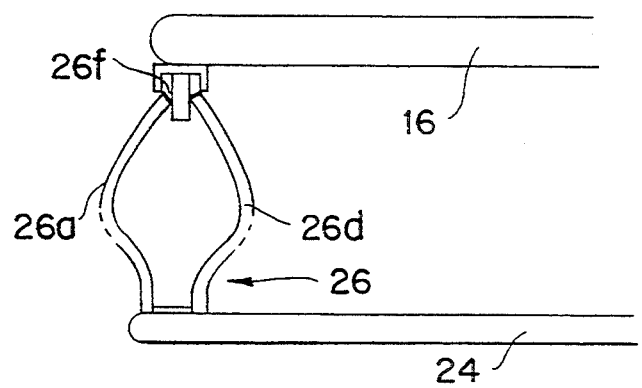
FIG. 4b is an enlarged view illustrating the deformation of the support member according to the present invention after force is applied to the deformable energy absorbing member.

As illustrated in FIG. 4b, if an impact occurs and an occupant's knees engage the closure member 24, a deformable energy absorbing member disposed within the closure member 24 will be driven rearwardly to engage the end portion of the wall members 26a, 26d against the bracket 28. In view of the fact that the guide member 29 is positioned within an aperture 26f disposed within the end portion, as a force is applied to the support member 26, the guide member 29 retains the support member 26 relative to the bracket 28. The walls 26a, 26d will deform to curve outwardly to thus control the force of the energy supplied from the knee bolster. In this way, when the knees of an occupant who is involved with a vehicle crash impact on the deformable energy absorbing member, the amount of force absorbed by the deformable energy absorbing member disposed within the front surface of the glove box 41 will be controlled as the member is moved rearwardly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A knee bolster for a vehicle for engaging a knee of a vehicle occupant in case of a vehicle crash comprising:

a deformable energy absorbing member adapted to be positioned opposite to a knee of the vehicle occupant, said deformable energy absorbing member having a first end and a second end defining a predetermined length;

a support member operatively connected to at least one of said first end and said second end of said deformable energy absorbing member, said support member being a deformable energy absorbing connector extending at a predetermined angle relative to said deformable energy absorbing member to a distal end thereof;

a guide member operatively positioned to engage said distal end of said support member, said guide member including a guide portion adapted to be received within the distal end of said support member and overlap said distal end of said support member, said support member and said guide member being operatively arranged relative to each other for controlling the force of energy supplied from said knee bolster during a vehicle crash; and a deformable support beam for absorbing energy from said deformable energy absorbing member through said support member, said support beam including a first end and a second end;

said guide member being secured to said support beam and at least one end of said support beam being adapted to be secured to a frame member of a vehicle.

2. The knee bolster according to claim 1, wherein said support member is an elongated, deformable member including an end portion with an aperture for receiving said guide member and wall members affixed to said end portion and extending therefrom to be connected to said deformable energy absorbing member.

3. The knee bolster according to claim 1, wherein said deformable energy absorbing plate-member is disposed within a closure member of a glove box.

4. The knee bolster according to claim 1, wherein said support beam is a tubular member extending below said knee bolster to a position behind said knee bolster and disposed within a vehicle dashboard.

5. The knee bolster according to claim 1, wherein said guide member is a pin projecting from the support beam.

6. The knee bolster according to claim 2, wherein said wall members of said support member are deformed to curve outwardly for controlling the energy supplied to the deformable energy absorbing member during a vehicle crash.

7. The knee bolster according to claim 1, wherein said deformable energy absorbing;member forms a forward portion of a glove box and said guide member is disengaged from said support member when said glove box is rotated to an open position.

* * * * *